United States Patent [19]
Romans

[11] Patent Number: 5,542,364
[45] Date of Patent: Aug. 6, 1996

[54] SEED METERING DEVICE

[76] Inventor: William W. Romans, 1121 NW. Parkridge Dr., Ankeny, Iowa 50021

[21] Appl. No.: 382,367

[22] Filed: Feb. 1, 1995

Related U.S. Application Data

[63] Continuation of Ser. No. 51,174, Apr. 22, 1993, Pat. No. 5,392,707.

[51] Int. Cl.$^6$ ........................................................ A01C 7/04
[52] U.S. Cl. ............................ 111/185; 111/177; 221/211; 221/278
[58] Field of Search .................................. 111/177, 183, 111/184, 185; 221/211, 278

[56] References Cited

U.S. PATENT DOCUMENTS

| | | | |
|---|---|---|---|
| 773,205 | 10/1904 | Green | 111/185 X |
| 3,048,132 | 8/1962 | Morgan et al. | 111/184 X |
| 3,434,437 | 3/1969 | Mark et al. | 111/185 |
| 3,693,833 | 9/1972 | Weitz | 221/211 |
| 4,047,638 | 9/1977 | Harrer et al. | 221/266 |
| 4,241,849 | 12/1980 | Harrer | 221/266 |
| 4,399,757 | 8/1983 | Maury | 111/34 |
| 4,515,291 | 5/1985 | Holmes | 221/211 |
| 4,664,290 | 5/1987 | Martin et al. | 111/185 X |
| 4,896,616 | 1/1990 | Wintersteiger et al. | 111/185 |
| 4,917,029 | 4/1990 | Upadhyaya et al. | 111/185 |
| 5,035,190 | 7/1991 | Grimes | 111/184 X |
| 5,143,002 | 9/1992 | Gaspardo | 111/185 |
| 5,170,909 | 12/1992 | Lundie et al. | 221/211 |

FOREIGN PATENT DOCUMENTS

| | | | |
|---|---|---|---|
| 338883 | 10/1989 | European Pat. Off. | 111/185 |
| 2011462 | 9/1971 | Germany | 111/185 |
| 2901465 | 7/1979 | Germany | 111/185 |
| 146105 | 7/1962 | U.S.S.R. | |
| 1064888 | 1/1984 | U.S.S.R. | 221/211 |
| 1516031 | 10/1989 | U.S.S.R. | |
| 940280 | 10/1963 | United Kingdom | 111/184 |

OTHER PUBLICATIONS

"Kinze 2000 Series Planters" Brochure From Kinze Manufacturing Inc.
"Max Emerge 2—Drawn, Integral, and Unit Planters" Brochure From John Deere.
"Why No—Till Planted Soybeans Outyield No—Till Drilled" Brochure by White.

*Primary Examiner*—Eric K. Nicholson
*Assistant Examiner*—John A. Ricci
*Attorney, Agent, or Firm*—Zarley, McKee, Thomte, Voorhees, & Sease

[57] ABSTRACT

The invention is a seed metering device for metered discharging of agricultural seeds and the like. The seed metering device is designed to collect seed in a singular or group fashion and deposit the same at predetermined and accurate intervals in a seed trench. The device includes a seed disk which contains a plurality of seed containment pockets. These pockets can be depressurized by imparting a partial vacuum. The seed disk sits between a manifold and a housing which define a seed collection area and a seed release area. Seed enters the seed collection area through a seed intake opening in the upper portion of the housing. This portion opens to a seed downfall region that widens into the seed collection area. As the disk rotates between the seed collection area and the seed release area, the seed pockets contained on the seed disk are pressurized thereby acquiring a seed and carrying or conveying the seed to the seed release point. When the seed pocket reaches the seed release point, the vacuum within the pocket is neutralized causing the seed to fall from the seed disk into the seed release area and out through a seed release opening.

1 Claim, 5 Drawing Sheets

SEED METERING DEVICE

This is a continuation of application Ser. No. 08/051,174 filed on Apr. 22, 1993 now U.S. Pat. No. 5,392,707.

BACKGROUND OF THE INVENTION

A. Field of the Invention

This present invention relates to seed planting and, in particular, to seed metering in for example agricultural planting for a variety of different types of seeds and conditions.

This invention allows a user to dispense agricultural seed and the like in a substantially uniform and singulated manner. It can be used in a grain drill or other agricultural planting implements. It allows such options as maintenance of a desired spacing between agricultural seeds during planting while decreasing the row width required so as to increase the propagated area of a given agricultural plot of land.

B. Problems in the Art

A variety of devices and methods for planting seeds exist. The apparatus and process for planting of certain seeds depends on a variety of factors including but not limited to type, size, and shapes of seed, ground characteristics, row width and plant spacing (if planted in rows), etc. Many types of agricultural planting, for example, benefit from accurate and nondestructive handling of seeds. Many conventional planters, therefore, are quite complex and expensive. Moreover, sheer size of the mechanisms used for seed metering make them cumbersome and inflexible, particularly when attempting to incorporate them in relatively small spaces or relatively close together.

This invention specifically addresses problems in the art of planting various agricultural seeds through the use of a grain drill or similar agricultural implement currently gaining increased acceptance for use in no-till farming techniques. Current seed metering systems used for drills are inaccurate, expensive to produce, and have a tendency to damage seed during distribution.

Further, the metering capabilities of the existing state of the art grain drills excludes its usage for crops such as corn and sorghum because of the need to singularly place the seed during planting. Collectively, these two crops constitute forty percent of the approximately 242 million acres currently devoted to agricultural production in the United States. If grain drills could be made more versatile and used for crops such as corn, sorghum, wheat, soybeans and other grains such as edible beans, barley, oats, etc., an average cultivator or producer of these crops could accomplish his seeding without the use of two separate implements, such as a grain drill and planter.

Corn planting devices, for example, tend to utilize rather complex, large structure to increase accuracy and the handling capabilities of the seeds. This in turn limits the ability to utilize such seed meters in very close row spacings. It also makes the manufacturing cost and subsequent purchase price of such machines very costly. Therefore, farmers are required to buy at least one other planting device, usually a grain drill, to accomplish closer row spacing. However, as stated above, current seed metering aparatus for grain drills do not provide the needed advantages regarding accuracy and careful handling of seeds.

The importance of the above-mentioned problems to farmers is a very practical one. Reduced accuracy translates in to use of more seeds or loss of plant population. Damage to seeds results in reduced plant population. Inaccuracy or inexact operation also contributes to poor effectiveness and efficiency of the planter. Complex structure requires more and costlier materials and assembly. In the end, each of these matters results in increased cost either to the farmer in equipment or in results after planting. Many present grain drill systems also use a fluted feed cup which may or may not be adjustable to adapt to seeds of different size and shape.

There is a need in the art for a device which improves upon the problems and deficiencies in the art, and which is, for example, easy and quick to use, effective, reliable, and compact. While devices which attempt to achieve these objectives exist traditional for planters (as opposed to drills), deficiencies still exist, and a device is needed to singulate and meter seeds for use with grain drills. The need also exists for a seed meter which is less costly to manufacture, assemble, and operate.

It is therefore a principal objective of the present invention to provide a seed metering device which improves upon or solves the problems and deficiencies existing in the art.

It is a further objective of this invention to provide a seed metering device wherein seed is singulated and metered in a manner which will deliver agricultural seed at a chosen rate, evenly, and deter any damage to the seeds.

Another objective of this invention is to provide a seed metering device which accurately spaces agricultural seed within a seed trench or furrow.

Another object of the present invention is to provide a seed metering device which deters problems with singulation, such as carry over or missing seeds.

A still further object of the present invention is to provide a seed metering device which is applicable to a wide variety of seeds.

Another object of the present invention is to provide a seed metering device which is relatively non-complex in structure while maintaining high accuracy.

A still further object of the present invention is to provide a seed metering device which is very flexible as to types of seeds in planting, as well as the speed or rate of planting, and which can operate at substantially higher speeds or rates of planting than is presently conventional on grain drills.

Another object of the present invention is to provide a seed metering device which is efficient and economical, including which respect to the type and cost of materials, the power requirement, and resulting plant population accuracy.

Another object of the present invention is to provide a seed metering device which is durable and easy to manufacture and maintain.

These and other features, objectives, and advantages of the invention will become apparent to those skilled in the art with reference to the accompanying specification.

SUMMARY OF THE INVENTION

The present invention relates to a seed metering device for use with planting implements, and in particular with grain drills used in no-till farming. The invention allows accurate and reliable placement of agricultural seed with respect to one anothers and provides a singulation system which is gentle with the seeds while, at the same time, able to operate at several variable speeds. A variety of types of agricultural seed can be used with the seed metering device of the present invention and alternative embodiments exist to allow for different sizes and shapes of seeds.

The invention is a seed metering assembly including a manifold block which on one side provides an area of vacuum and on the other side an area for neutralizing the vacuum. A relatively small-diameter seed disk or distribution wheel having a plurality of seed pockets is supported for rotation relative to the side of the manifold carrying the areas of vacuum and neutralized vacuum. The seed pockets have a seed-holding cavity which narrow to a vacuum passage extending from the seed pocket to the side of the seed disk directly adjacent the manifold.

A compact housing is coupled to said manifold and surrounds the seed disk, and helps define two areas, a seed collection area and a seed release area. The housing has an opening in the top portion to allow seed from bins located above the seed metering device to provide seed into the seed collection area. The opening in the top portion widens into the seed collection area to allow for a free flow of seed. A gate is also located extending from the opening in the top portion of the housing, The gate essentially funnels the seed from the bin into the seed collection area while creating a void above the seed collection area and adjacent the opening to prevent seed from being carried over along the turning seed disk.

In operation, seed containment pockets are charged with a partial vacuum as they pass the area of vacuum thereby acquiring a seed in the seed collection area. The seed in each charged pocket is then carried from the seed collection area to the seed release area where the vacuum is neutralized by allowing air to flow into the seed containment pocket. The seed is then released and flows down a seed tube into the trench or furrow.

DETAILED DESCRIPTION OF THE PREFERRED EMBODIMENT

Figure 1:
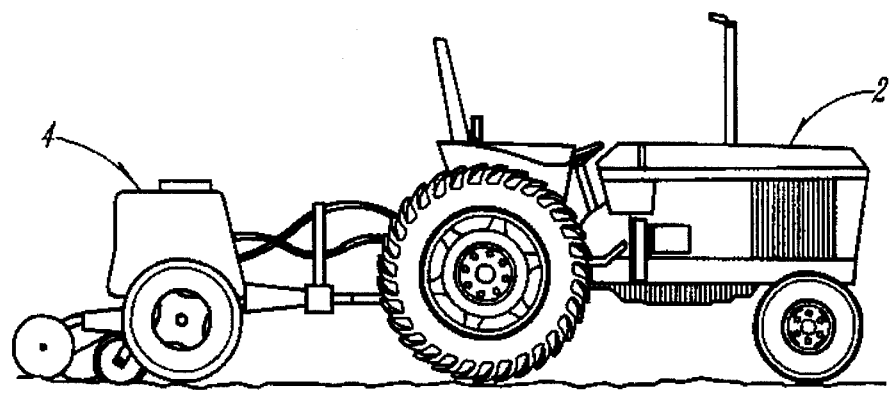
FIG. 1 is an elevational view of a tractor towing an implement containing a plurality of preferred embodiments of the seed metering devices according to the present invention in a grain drill.

To provide a better understanding of the invention, one preferred embodiment of the invention will now be described in detail. It is to be understood that the preferred embodiment discussed below is but one form the invention can take and is not exclusive.

The description will make frequent reference to the accompanying drawings. Reference numerals and/or letters will be utilized to indicate certain parts or locations in the drawings. The same reference numbers and/or letters will be used to indicate the same parts or locations in all of the drawings unless otherwise indicated.

Figure 2:
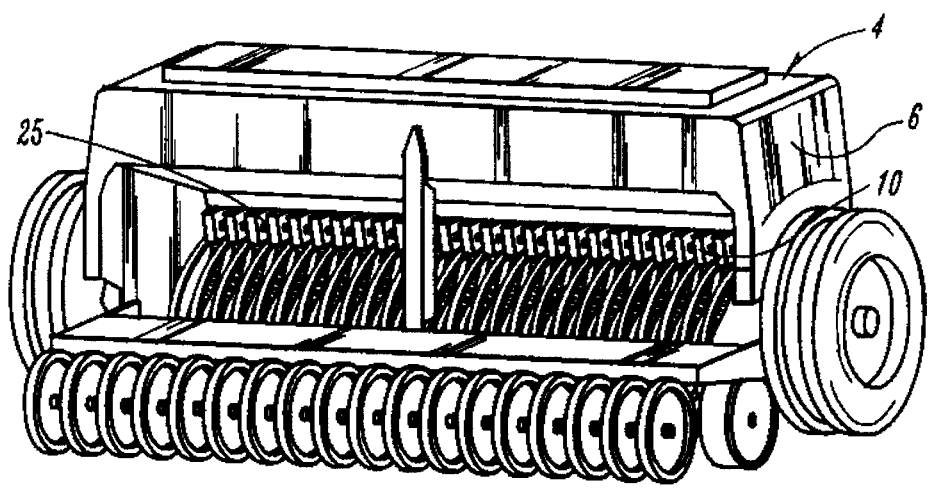
FIG. 2 is an enlarged perspective view of the farm implement of FIG. 1 showing the plurality of seed metering devices.

FIGS. 1 and 2 depict one environment in which the seed metering device of the present invention can exist. In FIG. 1, tractor 2 is shown connected to grain drill implement 4, in a typical arrangement for planting row crops in the ground.

Figure 11:
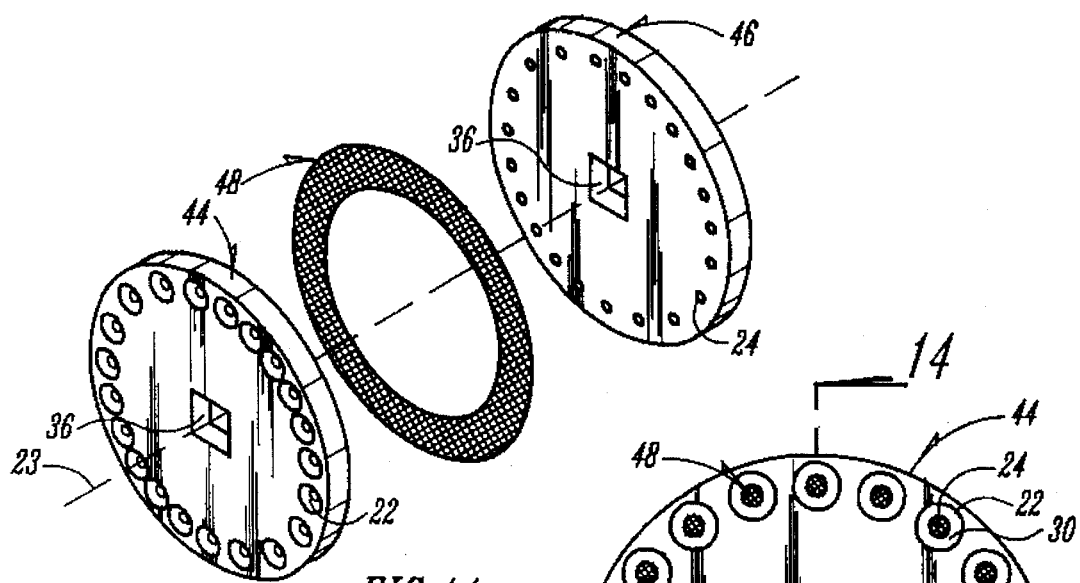
FIG. 11 is an exploded view of an alternative embodiment of a seed disk.
Figure 12:
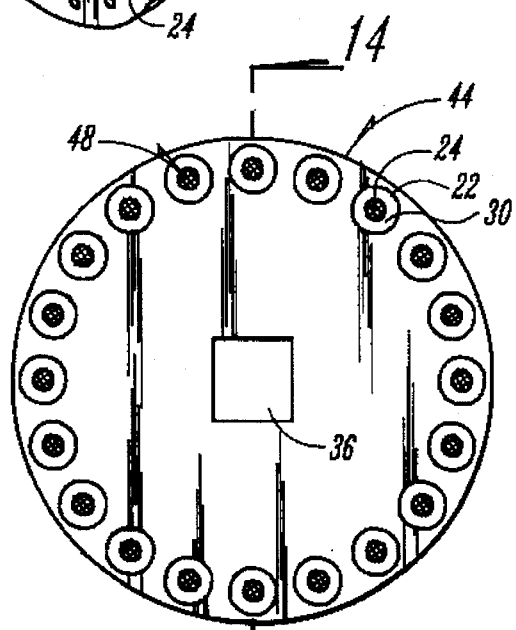
FIG. 12 is a front elevational view of the seed disk of FIG. 11.
Figure 13:
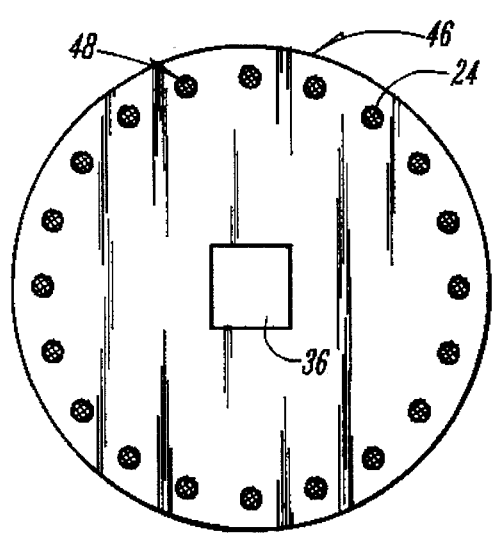
FIG. 13 is an elevational view of the rear portion of the seed disk of FIG. 11.
Figure 14:
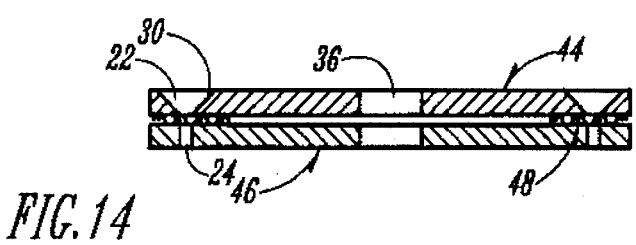
FIG. 14 is a sectional view taken along line 14—14 of the seed assembled disk of FIG. 12.

In FIG. 2, the rear of implement 4 can be seen. In this embodiment, grain drill 4 includes a plurality of closely spaced row-planting apparatus, in this case each only several inches apart. In particular in FIG. 2, the plurality of seed metering devices 10 according to the preferred embodiment of the invention can be seen distributed basically aligned laterally common drive rod 25 (see also FIG. 11) across implement 4. The size of devices 10 is relatively compact both width and height (as well as depth) to allow close spacing in the implement 4. As will be discussed in more detail later, devices 10 receive seed from large seed box 6, singulate that seed and through additional components present it in accurately timed succeeding intervals to ground working tools that plant it into the ground.

It can therefore be seen that a major advantage of the present invention, as embodied in seed metering devices 10, is that they can easily be incorporated into a planting implement, even when row spacing is very close (a matter of several inches) apart. It is to be understood, however, that devices 10 could be spaced apart differently and that they could be utilized with other types of planting apparatus, such as more conventional planters of corn or soybeans.

FIGS. 3–10 show in detail the structure of each seed metering device 10. The seed metering device 10 of FIG. 3 consists of a manifold or manifold block 12, a seed disk 14, and a housing 16. The manifold 12 contains a disk cavity 18 wherein the seed disk 14 is positioned and retained for rotational movement. A C-shaped vacuum groove 20 is positioned in cavity 18 of the manifold 12 on the side adjacent the seed disk 14. The seed disk 14 contains a plurality of seed containment pockets 22 aligned in a circle towards the perimeter of disk 14. A vacuum passage 24 extends from the seed containment pocket 22 to the side of the seed disk 14 adjacent the C-shaped vacuum groove 20. The C-shaped groove 20 matches the circle of pockets 22 when disk 14 is placed in cavity 18.

Figure 3:
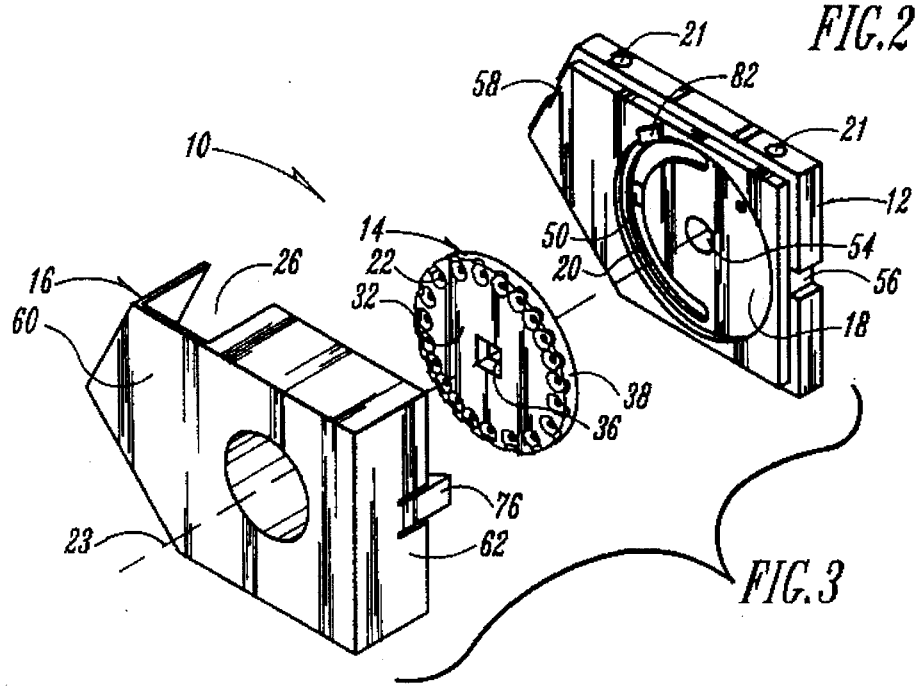
FIG. 3 is a still further enlarged exploded perspective view of an embodiment of the seed metering devices of FIG. 2.

The housing 16 in the preferred embodiment is basically releasibly connectable to manifold 12 and surrounds and holds in place seed disk 14 in disk cavity 18 of manifold 12. Housing 16 includes a seed intake opening 26 and a seed release opening 28. As can be seen in FIG. 3, therefore, seed metering device 10 consists of three relatively non-complex major components; manifold 12, seed disk 14, and housing 16. Metering device 10 can be secured to structure on implement 4 by means well within the ability of those skilled in the art. For example, 21 could be used to bolt or otherwise secure manifold 12 in place.

As will be discussed further below, a drive rod having a square cross-section (not shown, but see for example, drive rod 25 in FIG. 2) could extend along axis 23 through manifold 12, seed disk 14, and housing 16, and serve to rotate seed disk 14 within manifold 12 and housing 16. The drive rod could be powered to different speeds in a variety of ways such as are known in the art. Examples are a gear box connected to a ground engagement wheel, hydraulic motor, or direct current electrical motor. Other configurations of the means of driving the disks 14 are possible.

Figure 4:
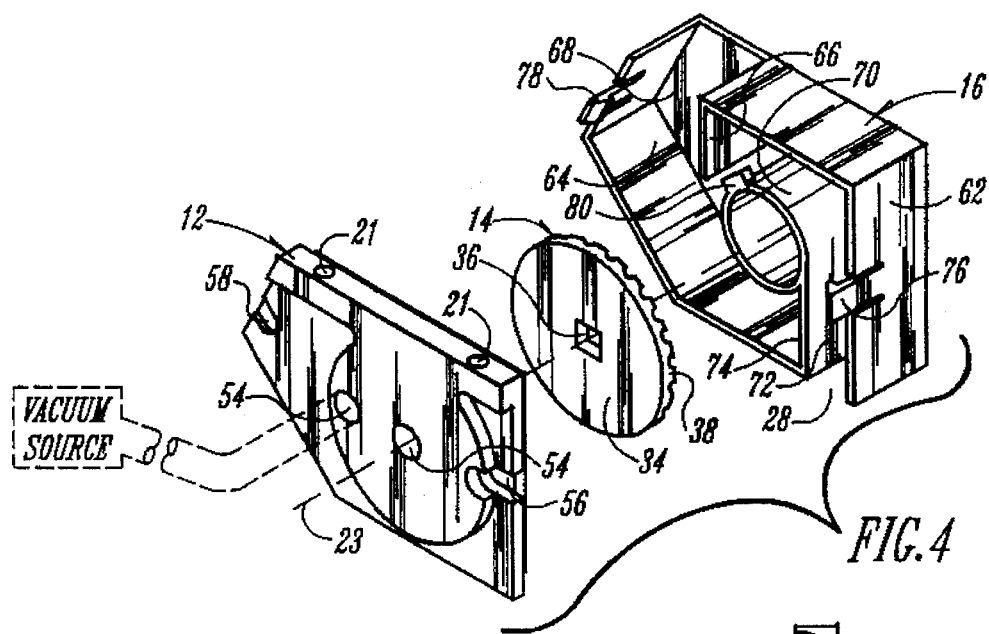
FIG. 4 is a reverse exploded perspective view of an embodiment of the seed metering device of FIG. 3.

FIG. 4 shows metering device 10 in perspective view, but a reverse view from that in FIG. 3. The internal structure of housing 16 can be seen and will be described in more detail below. FIG. 4 also shows the back side of manifold 12 and diagrammatically indicates connection of vacuum line 25.

Figure 5:
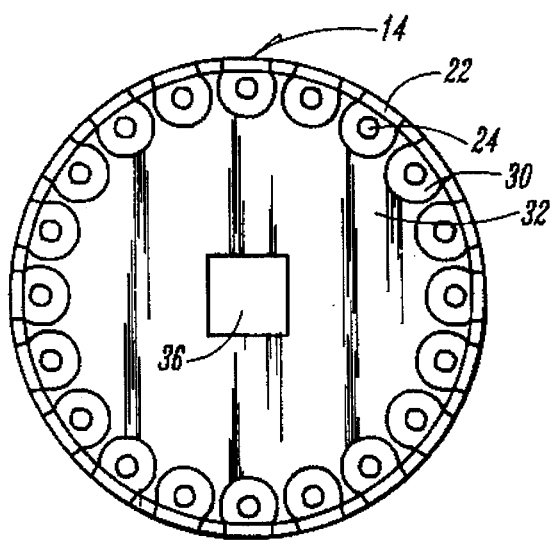
FIG. 5 is an elevational plan view of one embodiment of a seed disk useable with the present invention.
Figure 6:
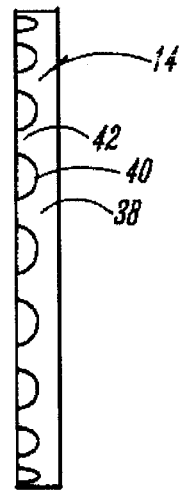
FIG. 6 is a side elevational view of the seed disk of FIG. 5.

Looking more closely at the seed disk 14, FIG. 5 shows a seed disk 14 according to a preferred embodiment of the invention containing a plurality of seed containment pockets 22 in a substantially circular orientation around the perimeter of the seed disk 14. Each seed containment pocket 22 has an upper rim 30 located on the surface of the seed disk 14. The seed containment pocket 22 is substantially conical in shape, with the base of the cone being flush with the face 32 of the seed disk 14. The seed containment pocket 22 narrows from the upper rim 30. A narrow vacuum passage 24 extends between the seed containment pocket 22 and the rear 34 of the seed disk 14. The vacuum passage 24 intersects the seed containment pocket 22 near the bottom or deepest part of the pocket 22. A shaft engagement means 36 for engaging, for example, drive shaft 25 of FIG. 2 is positioned in the seed disk 14 so that a means (not shown) for rotating the seed disk can be operatively connected thereto. The upper rim 30 of the seed containment pockets 22 intersect the other edge 38 of the seed disk 14 and form a side ridge 40 located on the side face 42 of the seed disk 14. This results in a dimpled side face 42 as best shown in FIG. 6. Seed disk 14 in FIGS. 5 and 6 works for a number of different types, sizes, and shapes of seeds; particularly seeds of relatively larger size. Other sizes and shapes of pockets 22 and disk 14 are possible.

Figure 7:
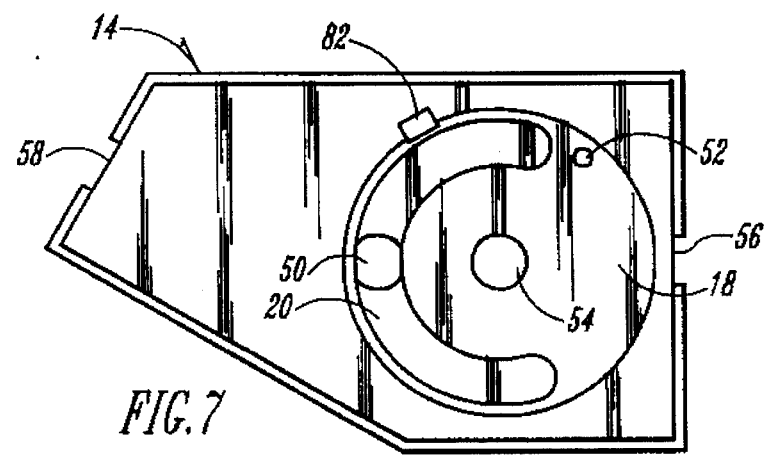
FIG. 7 is an enlarged isolated elevational view of the housing of FIG. 4.

The side of manifold 12 containing vacuum groove 20 is shown more closely in FIG. 7. The C-shaped vacuum groove 20 is found in the disk cavity 18 and is positioned so that the vacuum passage 24 (which is attached to vacuum line 25) of the seed disk 14 empties into the groove 20. A vent 50 in the C-shaped vacuum groove 20 allows the vacuum source (See FIG. 4) to create at least a partial vacuum within the C-shaped vacuum groove 20. An air inlet means 52 is positioned in the disk cavity 18 so that the vacuum passage 24 of the seed disk 14 passes adjacent thereto. The air inlet 52 of the preferred embodiment is vented through the manifold 12 and to an area having an atmospheric pressure suficient to neutralize the vacuum imparted into the seed containment pockets 22 and vacuum passage 24 by the pressure of the C-shape vacuum groove 20. A shaft passage 54 in the manifold 12 allows the seed disk 14 to be connected to the rotating means (not shown, but could be for example, drive shaft 25 of FIG. 2) used to rotate disk 14. Two recessed areas 56, 58 serve as connecting means to said housing 16. The preferred embodiment is shown as being connectable by clips means 76, 78 on housing 16 which snap into position at areas 56, 58. However, other joining and connecting means such as bolts, screws, permanent adhesive and the like may be utilized.

Figure 8:
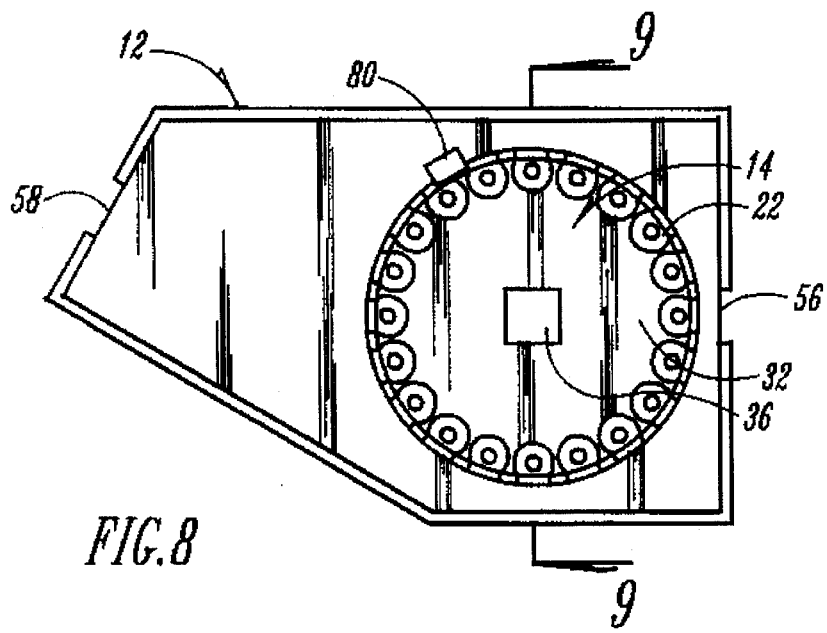
FIG. 8 is a side elevational view of the housing of FIG. 7 with the seed disk of FIG. 8 in position.

FIG. 8 shows seed disk 14 installed in disk cavity 18 of manifold 12. Seed disk 14 fits matingly within cavity 18 so that there is little play between the two, and yet disk 14 can freely rotate therein.

Figure 9:
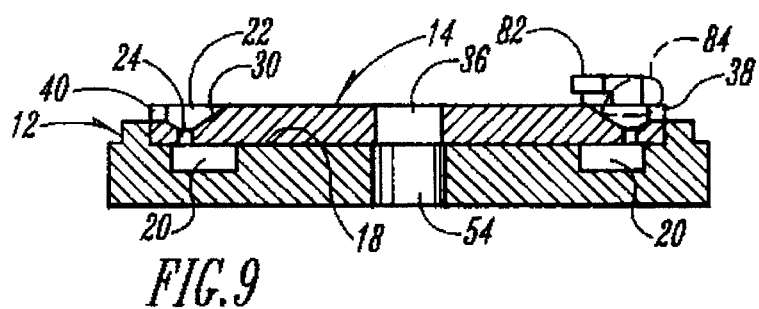
FIG. 9 is a sectional view taken along line 9—9 of FIG. 8.

FIG. 9 also shows in more detail the structure of seed pockets 22, and the relationship of disk 14 when in cavity 18. Note particularly the asymmetrical shape of seed pockets 22, with the outer side of the pocket lower and shorter than the inner side. This assists in the handling of seeds and dispensing of seeds.

Figure 10:
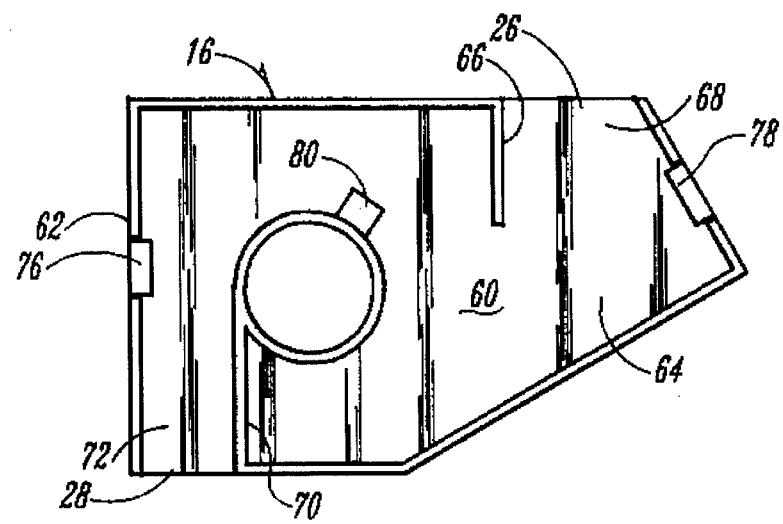
FIG. 10 is a reverse elevational view of the housing of FIG. 7.

The housing 16 is also shown in detail in FIG. 10 (refer also to FIG. 4). Housing 16 of the preferred embodiment is comprised of a front wall 60 which lies in a plane substantially parallel to the plane created by the manifold 12. A side wall 62 extends substantially perpendicular from the front wall 60 around the perimeter of the housing 16. The seed intake opening 26 is positioned in the side wall 62 and allows seed to flow into a seed collection area 64 located between the housing 16 and the manifold 12. A stationary partition 66 extends substantially perpendicular from the front wall 60 of the housing 16 toward the manifold 12.

A seed downfall region 68 is defined between the stationary partition 66, the side wall 62 directly opposite the stationary partition 66, and the seed intake opening 26. As shown in FIG. 10, the distance between the stationary partition 66 and the side wall 62 increases as the distance increases from the seed intake opening 26. This widening of the seed downfall region 68 prevents seed from bridging or building up within the seed downfall region 68. Further, the stationary partition 66 prevents seed from flowing over the radial wall 70 contained in the housing 16. The seed release opening 28 is located in the side wall 62 below the seed release area 72. The seed release area 72 channels seed toward the seed release opening 28 and is defined by the manifold 12, the front wall 60 of the housing 16, the side wall 62 of the house 16, and the interior wall 74 which extends from the radial wall 70 to the side wall 62 and isolates the seed collection area 64 from the seed release area 72. Clip means 76, 78, as previously described, operatively connect the housing 16 to the manifold 12 at the recessed areas 56, 58 of the manifold 12.

In order to prevent seed from being inadvertently carried from the seed collection area to the seed release area, knock off tab 80 is positioned on the radial wall 70 of the housing 16. A second knock off tab 82 is positioned on the manifold 12 to further prevent inadvertent seed carry over.

FIGS. 11 through 14 show an alternative embodiment of the seed disk 14 used for wheat and smaller seeds where singulation is not critical but volume output is. Essentially, the housing 16 and manifold 12 remain unchanged while the seed disk 14 is comprised of three sections, a pocket section 44, a passage section 46, and a particle screen 48. The particle screen 48 is positioned between the pocket section 44 and the passage containment section 46 so that elements contained within the seed containment pockets 22 are not free to pass through the vacuum passage 24. Therefore, the mesh 50 in the particle screen 48 allows air to pass therethrough, but is woven to a sufficient width so as to prevent seeds small enough to passed through the vacuum passage 24 from passing through the mesh 50 and into the vacuum passage 24.

Figure 15:
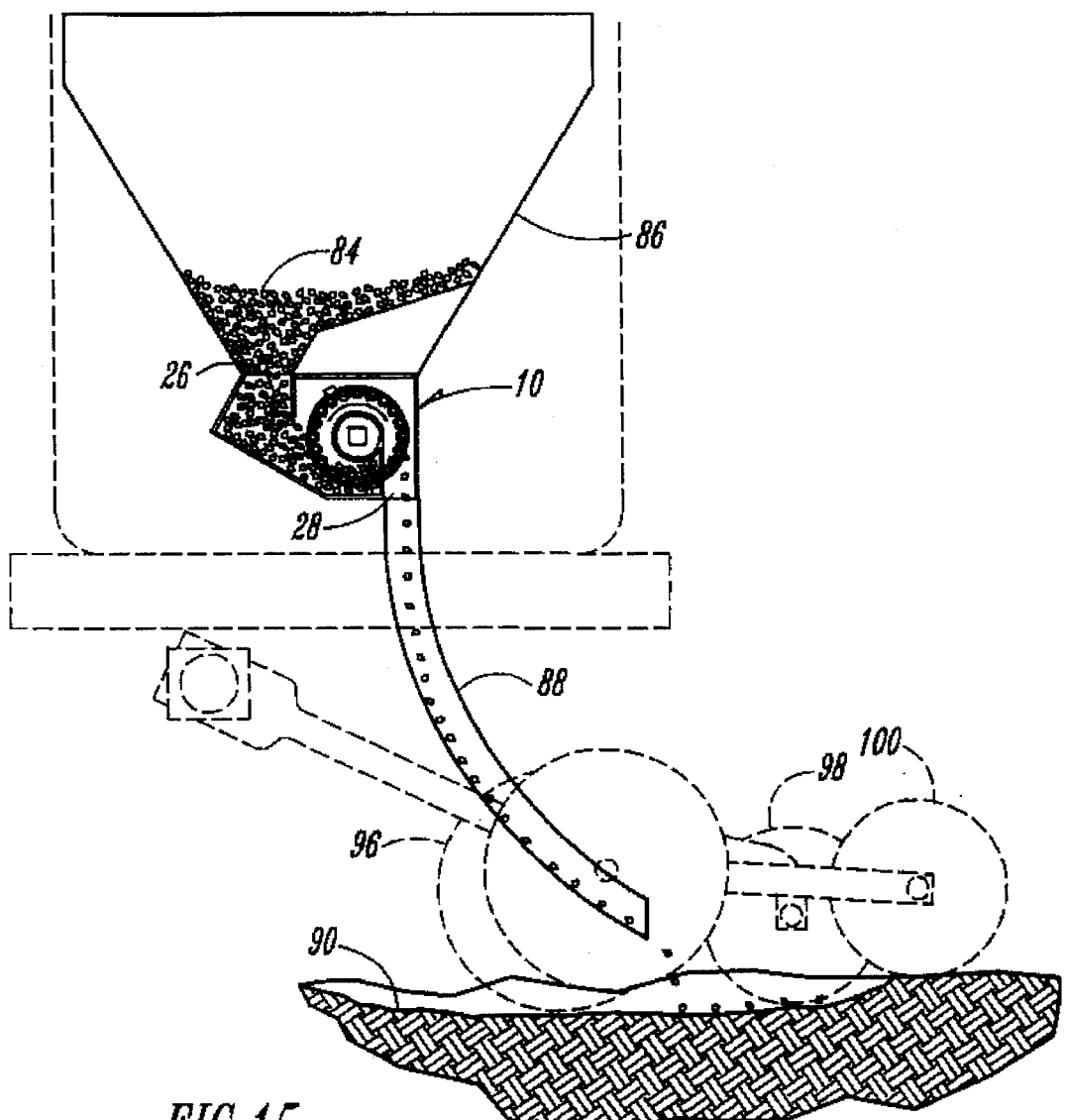
FIG. 15 is a partial sectional, elevational view of a seed metering device according to the present invention as installed in a farm implement.

The operation of the seed metering device 10 is best illustrated by referring to FIGS. 8 and 15. Seed from bin 86

(FIG. 15) falls by gravity into the seed collection area 64 of meter 10. The seed disk 14 rotates at a predetermined speed which allows the user to set the distance between the singulated seed. A vacuum charges the C-shaped vacuum groove 20 (shown in ghost lines in FIG. 8). In turn, this vacuum pressure is communicated to the seed containment pockets 22 by traveling through the vacuum passages 24 for those pockets 22 located in the seed disk 14 which at that moment are aligned with groove 20. As the seed disk 14 rotates, the vacuum transmitted to the C-shaped vacuum groove 20 typically causes a single seed to be acquired in the seed containment pockets 22 (if the second embodiment of the disk utilizing the particle screen 48 is used, more then a single grain may be acquired). This seed remains in the pocket 22 as the seed disk 14 rotates from the seed collection area 64 to the seed release area 72. When the vacuum passage 24 is substantially adjacent to the air inlet 52, the seed containment pocket is vented to an area of greater atmospheric pressure, whereby the vacuum holding the seed within the seed containment pockets 22 is neutralized, causing the seed to fall from the seed containment pocket 22 into the seed release area 72 and out through the seed release opening 28. Further, due to the structure of the housing 16 and the size of the seed disk 14, vacuum sensitivity is less predominant with this new meter than other meters currently used on planters.

FIG. 15 shows the overall relation of all the parts of the present invention. Seed 84 in a seed bin 86 fills the seed collection area 64 by gravitationally flowing through the seed intake opening 26 and the seed downfall region 68. As the seed gathers in the seed collection area 64 the rotating seed disk 14 acquires a seed and conveys it rotatively to the seed release area 72 where the seed is released and falls down the curved seed tube 88 and into the seed trench 90. The curved seed tube 88 imparts a rearward velocity on the falling seed. Propelling the seed backward helps overcome the forward travel speed of the grain drill 92 giving a near dead drop of seed into the seed trench 90.

As shown in FIG. 2, a plurality of these seed metering devices 10 are positioned in a substantially linear orientation within a grain drill implement 4. This implement 4 is traditionally towed behind a tractor or other propulsion means 2. The opener wheel 96 opens a trench for the seed. The packing wheel 98 packs the ground around the seed. The closing wheel 100 operates to close the ground around the seed protecting the seed from the environment.

It is to be understood that in the prefered embodiment manifold 12, disk 14, and housing 16 can all be made of plastic moldable parts. This greatly enhances the economy of the preferred embodiment. The dimensions of device 10 can be varied, but in the preferred embodiment disk 14 is 3.5 inches in diameter, housing 16 is approximately 6 inches in its longest dimension and a little over 4 inches in opposite dimension, while being approximately 1.5 inches thick. Disk 14 is approximately 0.25 inch thick. Manifold 12 is similar perimeter dimensions to housing 16, and itself is approximately 0.75 inch thick. This relatively compact size therefore allows the close spacing of a plurality of devices 10 which in turn allows use of this metering device for closely spaced rows.

It is to be appreciated that the included preferred embodiment is given by way of example only. The present invention can take many forms and embodiments. The true essence and spirit of this invention is defined in the appended claim, and is not intended that the embodiment of the invention presented herein limit the scope thereof. It can be seen, however, that the present invention accomplishes at least all of the stated objectives.

For example, the preferred embodiment has been shown used with a grain drill. It can also be used in other types of planting devices including conventional corn planter type units or other more exotic planting devices. This highlights the flexibility of the present invention.

The invention has been discussed mainly with regard to corn, soybeans and wheat, but it has an almost universal nature and is applicable to a wide variety of seed sizes, and shapes. The invention can work with major seed crops such as field corn, soy beans, but also many different types of seeds including but not limited to such seeds as popcorn, pinto beans, etc.

It is also to be understood that the configuration of the preferred embodiment allows operation at a wide variety of speeds. That is, a high rate of seeds per second can be metered. For example, device 10 works accurately at 3200 or more seeds per minute. It also would work well for lesser rates. Additionally, device 10 can work adequately at relatively lower vacuum levels than exist in many vacuum powered seeding systems available today. This translates into energy or power savings.

What is claimed is:

1. A planting implement for row crops comprising:

a frame;

a seed bin on the frame;

ground working tools mounted to the frame;

a seed tube in communication with at least one ground working tool;

a drive shaft extending across at least a portion of the frame; and a plurality of seed meters mounted on the frame, said seed meters comprised of a manifold having a vacuum groove; a housing coupled to said manifold, said housing and said manifold defining a seed collection area and a seed release area, said housing being comprised of a front wall substantially parallel to said manifold and a side wall extending substantially perpendicularly from said front wall and generally contacting said manifold, said side wall containing a first aperture for seed intake and a second aperture for seed release, said housing further comprising a radial wall extending perpendicularly from said front wall located between said seed collection area and said seed release area; a seed disk supported for rotation between said housing and said manifold, said seed disk having a first side with a seed conveying element, and having a conducting means for transmitting vacuum between said seed conveying element and said vacuum groove while said seed conveying element is in said seed collection area; said seed disk further comprised of an opening to receive the drive shaft so that said seed conveying element travels rotatively between said seed collection area and said release area.

\* \* \* \* \*